B. A. SUSSIS.
DUMP WAGON AND LOADING MEANS THEREFOR.
APPLICATION FILED MAR. 13, 1918.

1,334,002.

Patented Mar. 16, 1920.
3 SHEETS—SHEET 1.

WITNESSES
Henrietta Oberwager
John E. Burch

INVENTOR
Bernhard A. Sussis,
BY Richard B. Owen.
ATTORNEY

B. A. SUSSIS.
DUMP WAGON AND LOADING MEANS THEREFOR.
APPLICATION FILED MAR. 13, 1918.
1,334,002.
Patented Mar. 16, 1920.
3 SHEETS—SHEET 2.
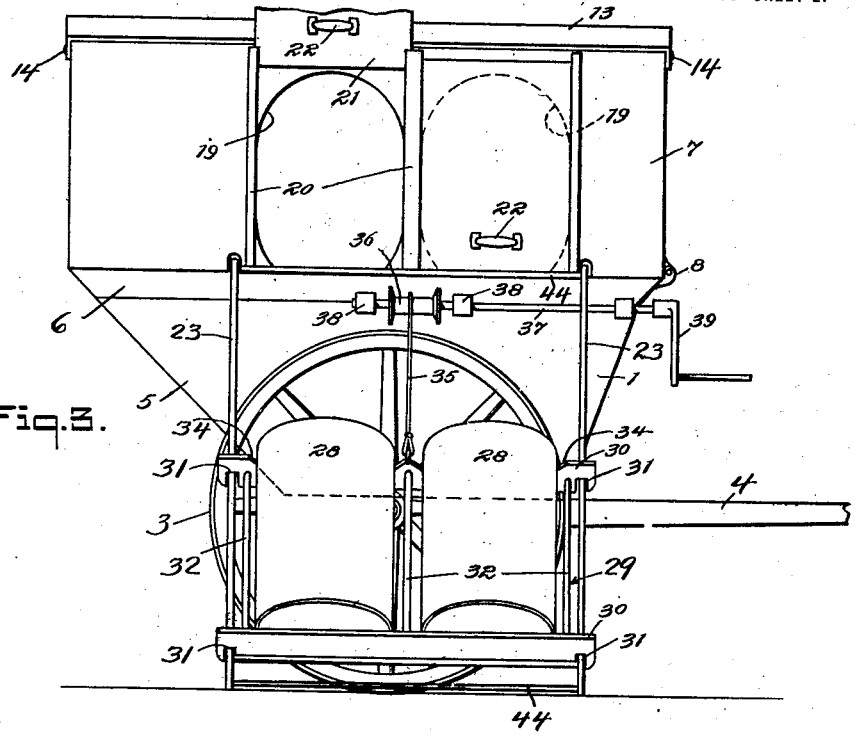
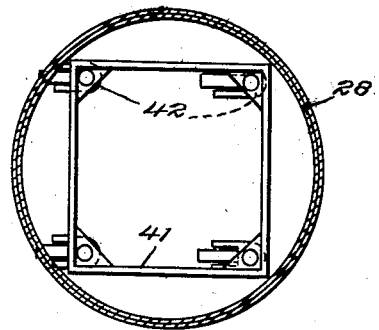
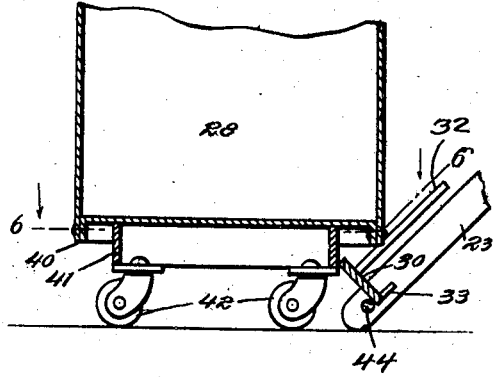

B. A. SUSSIS.
DUMP WAGON AND LOADING MEANS THEREFOR.
APPLICATION FILED MAR. 13, 1918.
1,334,002.
Patented Mar. 16, 1920.
3 SHEETS—SHEET 3.
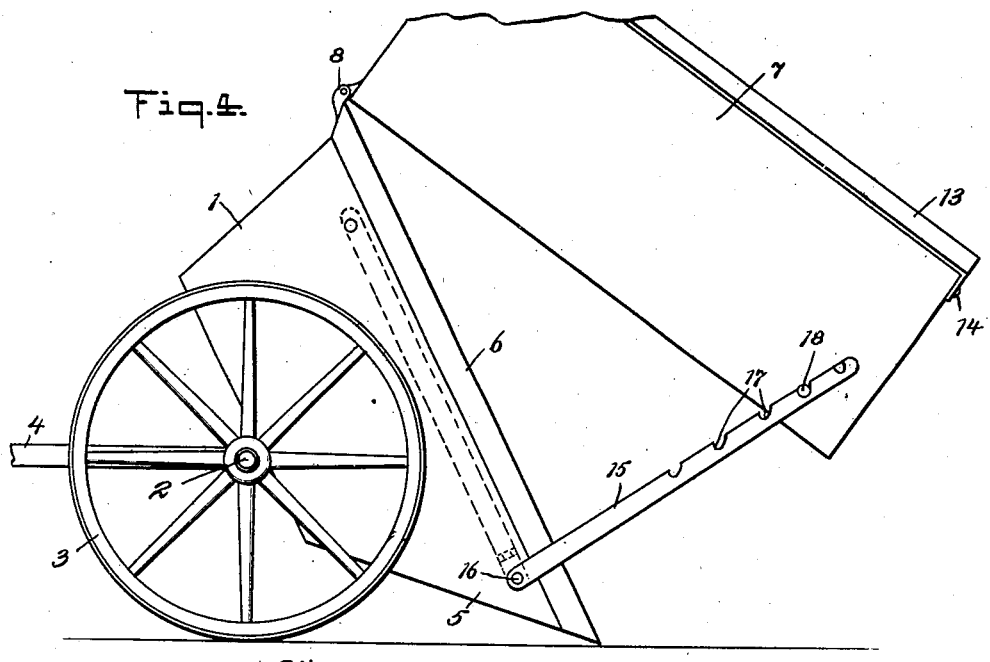
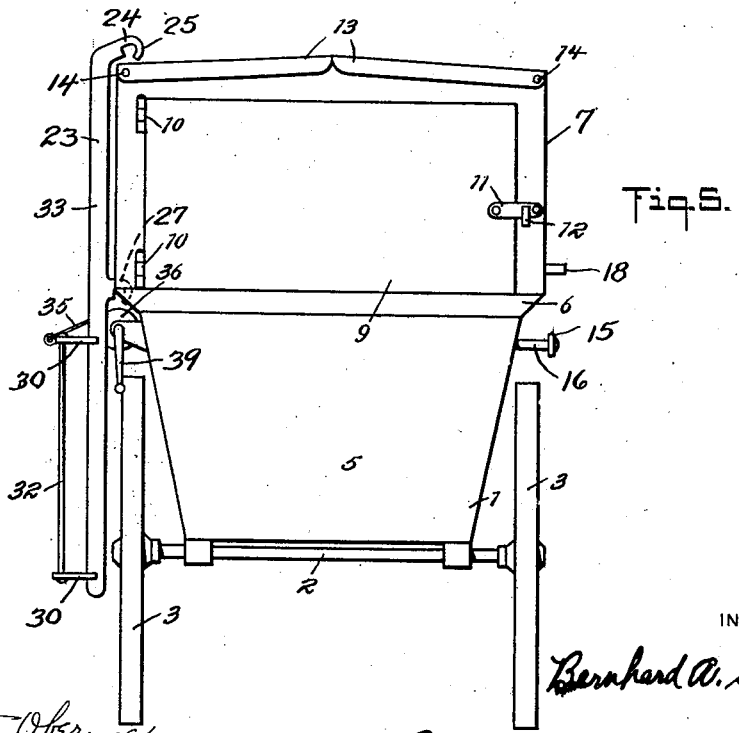
WITNESSES
INVENTOR
Bernhard A. Sussis,
BY
ATTORNEY

UNITED STATES PATENT OFFICE.

BERNHARD A. SUSSIS, OF NEW YORK, N. Y., ASSIGNOR OF FIVE PER CENT. TO JOSEPH A. FREIMAN, FORTY-TWO AND ONE-HALF PER CENT. TO DAVID SHWARTZ, AND TEN PER CENT. TO ALEXANDER KORENGE, ALL OF NEW YORK, N. Y.

DUMP-WAGON AND LOADING MEANS THEREFOR.

1,334,002.  Specification of Letters Patent.  Patented Mar. 16, 1920.

Application filed March 13, 1918. Serial No. 222,137.

*To all whom it may concern:*

Be it known that I, BERNHARD A. SUSSIS, a citizen of Russia, residing at New York city, in the county of New York and State of New York, have invented certain new and useful Improvements in Dump-Wagons and Loading Means Therefor, of which the following is a specification.

My invention relates to certain new and useful improvements in dump wagons and hoisting and loading means therefor and has for its primary object the provision of a dump wagon of simple construction and highly efficient in use.

Another object of the invention resides in the provision of a device of the above stated character which will be of such construction that a plurality of receptacles may be hoisted along one side of the wagon and the contents of the receptacles dumped through openings in the side extension of the wagon body.

The invention has for another object, the provision of improved and efficient means for raising or hoisting the receptacles and dumping the contents of the latter into the wagon.

A further object of the invention resides in the provision of an improved form of wagon body with openings in one side extension to receive the receptacles for the purpose of dumping the contents of the same into the wagon.

A further object of the invention resides in the provision of a dump wagon and receptacle hoisting and dumping means which will be of simple construction and operation and which will include a minimum number of parts.

With the above and other objects in view, the invention consists in the combination and arrangement of coöperating parts as hereinafter more specifically set forth, pointed out in the appended claims and shown in the accompanying drawings forming a part of this application.

Figure 1:
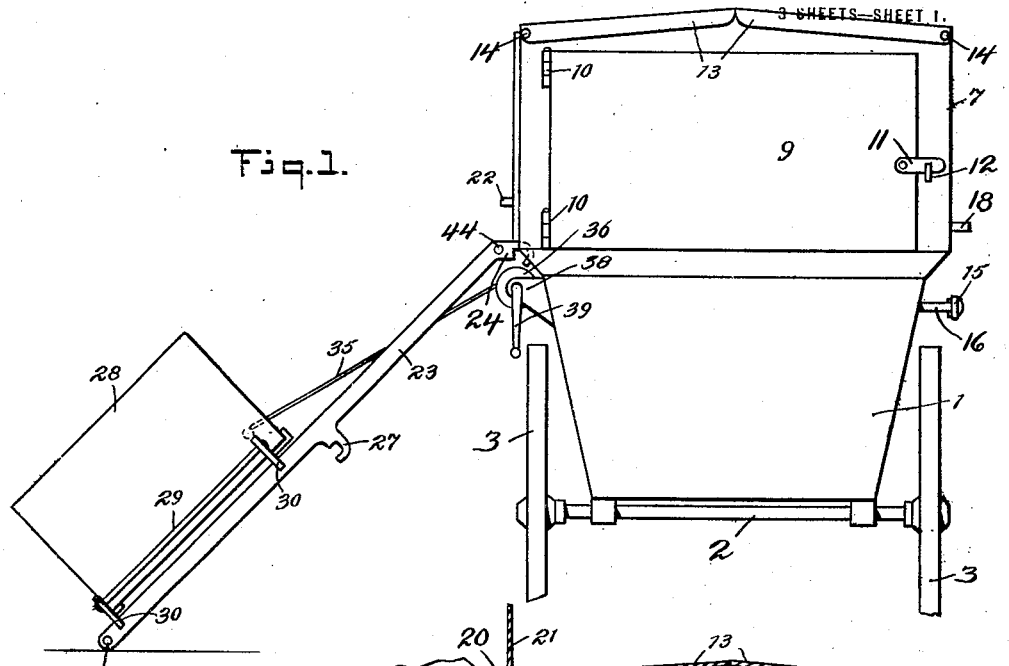
Figure 2:
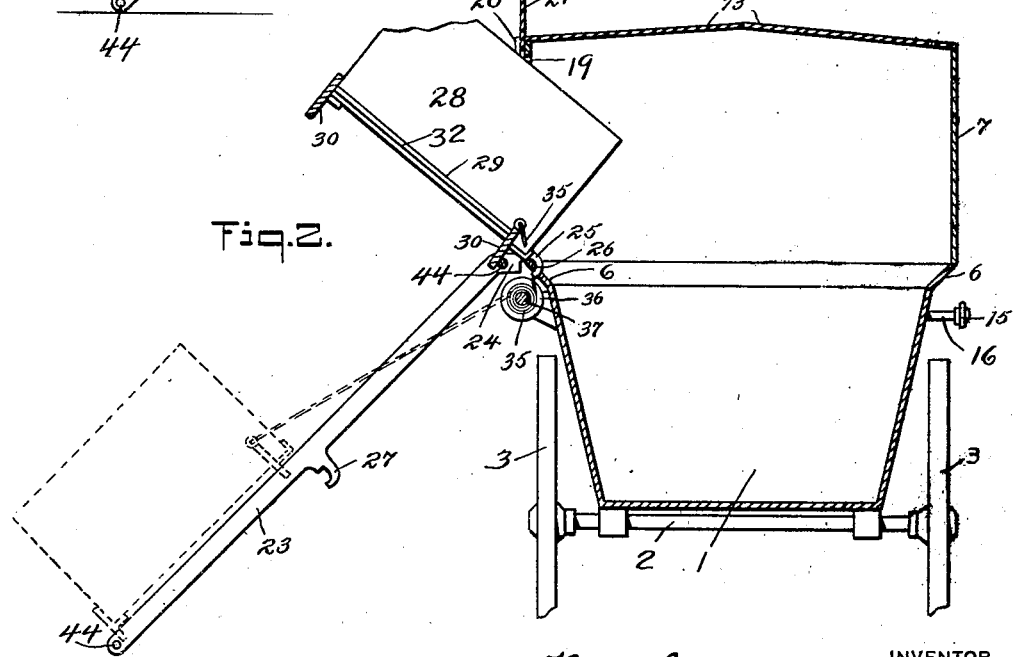

In the accompanying drawings,

Figure 1 is a rear elevation of the complete invention,

Fig. 2 is a transverse sectional view thereof, showing the operation of dumping the contents of the receptacles into the wagon, Fig. 3 is a side elevation of the invention, Fig. 4 is a side elevation, showing the method of dumping the wagon, Fig. 5 is a rear elevation of the invention with the hoisting and dumping means supported in inoperative position on the side of the wagon, Fig. 6 is a detail sectional view through the lower portion of the receptacle and the supporting means for the same, taken on the plane of line 6—6 of Fig. 7, looking in the direction indicated by the arrows and Fig. 7 is a vertical section through the receptacle and the supporting means for the same with the receptacle in position to be delivered upon the raising means.

Referring more particularly to the drawings in which similar reference characters designate corresponding parts throughout the several views, 1 designates the body of the wagon, which is mounted in the usual manner upon the transverse axle 2 having the ground wheels 3 mounted upon its opposite ends, a tongue 4 being provided for the wagon and extending from the axle bearings in any suitable and well known manner. The wagon body 1 is of conventional form and the type in which the rear end 5 is inclined and the upper edges of the sides and ends of the wagon body are extended outwardly to form the inclined flanges 6, as clearly shown in the drawings.

The wagon has a body extension 7 which rests upon the wagon body 1, said body extension 7 being of rectangular form and hinged to the main body 1 along the forward upper edge of the latter, as shown at 8, in Figs. 3 and 4. This body extension has a door 9 in its rear end hinged along one vertical edge by suitable hinge members 10, a latch 11 being carried by the door 9 at its opposite longitudinal edge and adapted for removable engagement with the stationary latch member 12 mounted on the rear end of said body extension 7. The body extension 7 is also provided with a cover formed in two longitudinal sections 13, hinged along their outer edges to the longitudinal edges of the body extension 7, as shown at 14. The body extension 7 may also be supported with its rear end raised when the wagon is dumped, as shown in Fig. 4 of the drawings, by means of the supporting member 15, which is pivoted to the side of the main body, near the rear upper corner thereof, as shown at 16. The supporting member 15 has notches 17 in one edge, within one of which is adapted to be engaged the pin 18 projecting from the side of the body extension 7, near the lower rear corner thereof.

The body extension is provided in one side with a series of openings 19, along the edges of which are provided guide strips 20 to receive the closure members or doors 21 for covering or closing the openings 19. The doors or closure members 21 have suitable handles 22 by means of which they may be raised or lowered.

The raising and dumping means comprises a removable track 23 which has inwardly turned upper ends 24 formed on its rail members with curved hooks 25 projecting therefrom and removably engaged through one of the side flanges 6 of the wagon, as shown at 26 to support the track in inclined position upon one side of the wagon, with the lower ends of the track rails rested upon the ground. The track 23 is also provided with hooks 27 intermediate the ends of the track rails, whereby the track may be suspended in substantially vertical position upon the side of the wagon, as shown in Fig. 5 of the drawings. The receptacles 28 are to be elevated to the opening 29 and then tilted to discharge their contents into the wagon, and to this end I have provided a double carriage 19 upon which the receptacles may be placed, as shown in the drawings. The carriage comprises transverse upper and lower members 30 which have recesses 31 in their lower edges to receive the track rails and guide the carriage upon the rails. The transverse upper and lower members 30 are connected by longitudinal or vertical bars 32. The inner edge of the lower transverse member 30 is directed upwardly, as shown at 33 to form a proper support for the lower ends of the receptacles 28. The transverse upper member 30 is provided with cut-away or recessed portions 34 to receive the receptacles 28, in order that they may be properly supported in inclined position upon the carriage. The carriage is adapted to be drawn upwardly upon the track by a cable 35 connected with the central portion of the upper transverse member 30 and also with the drum 36, upon which the cable 35 is adapted to be wound. This drum is mounted upon the shaft 37 which is adapted to be rotated within the bearings 38, by means of the handle 39 upon one end of the shaft 37.

Each receptacle 28 has a depending circumferential flange 40 to prevent the receptacle 28 from sliding off of the transporting carriage 41, which latter is mounted upon suitable rollers 42. The carriage 41 is provided for the purpose of transporting the receptacle 28 to the raising carriage upon the track rails 23.

When the wagon is to be moved, the track and raising carriage are supported upon the side of the wagon, as shown in Fig. 5 of the drawings. It is also believed that the operation of dumping the wagon will be readily understood by referring to the drawings, particularly to Fig. 4. Attention may be called to the fact, however, that the receptacles 28 will automatically tilt, as shown in Fig. 2 of the drawings, when the uppermost flange 30 is engaged with the upper cross rod 44 as the carriage is pulled upwardly, thus causing the receptacle to tilt for depositing the contents of the receptacles in the wagon, the ends of the receptacles 28 projecting through the openings 19.

It is believed that further description of this invention will be unnecessary. It may be mentioned, however, that I do not desire to be limited to the specific details of construction and arrangement of parts as shown in the drawings and herein described, as minor changes may be made within the scope of the appended claims without departing from the spirit of the invention.

I claim:—

1. A device of the class described comprising a wagon body, an extension for said body, said wagon body having a flange to support said extension, a track including parallel rail members having hooks formed thereon for engagement through said flanges, said track being adapted to be disengaged and suspended in vertical position upon said flange, a carriage movable upon said track when the latter is in inclined position, to dump material into said wagon body, and means for operating the last mentioned means.

2. A device of the class described comprising a wagon body having its upper edges extended outwardly to form inclined flanges, each side flange being provided with openings, a track including parallel rail members, each having a hook at one end and another hook intermediate its ends, a carriage movable on said rail members when the hooks at the ends of the rail members are disposed in the said openings in the side flanges, the said hooks at the intermediate portions of the said rail members being adapted for engagement with the said openings in the flanges when the said carriage and rails are disposed in inoperative position.

3. A device of the character described comprising a wagon body, inclined flanges formed at the upper marginal edges of the wagon body, a track comprising parallel rail members, each rail member having a hook at one free end, and a second hook intermediate its ends, each of the hooks being adapted for engagement with the flanges at one side of the wagon body whereby the said track rails may be disposed in an inclined position or in an inoperative vertical position.

In testimony whereof I affix my signature in presence of two witnesses.

BERNHARD A. SUSSIS.

Witnesses:
   HENRIETTA OBERWAGER,
   JOHN E. BURCH.